(12) United States Patent
Rusch et al.

(10) Patent No.: US 12,290,957 B2
(45) Date of Patent: May 6, 2025

(54) ELECTRIC TOOL

(71) Applicant: FESTOOL GMBH, Wendlingen (DE)

(72) Inventors: Marc Rusch, Esslingen am Nerckar (DE); Markus Schmid, Wendlingen am Neckar (DE)

(73) Assignee: Festool GmbH, Wendlingen (DE)

( * ) Notice: Subject to any disclaimer, the term of this patent is extended or adjusted under 35 U.S.C. 154(b) by 723 days.

(21) Appl. No.: 17/281,270

(22) PCT Filed: Sep. 24, 2019

(86) PCT No.: PCT/EP2019/075596
§ 371 (c)(1),
(2) Date: Mar. 30, 2021

(87) PCT Pub. No.: WO2020/069904
PCT Pub. Date: Apr. 9, 2020

(65) Prior Publication Data
US 2022/0001570 A1    Jan. 6, 2022

(30) Foreign Application Priority Data

Oct. 2, 2018   (DE) .......................... 102018216933.0

(51) Int. Cl.
   *B27G 19/04*   (2006.01)
   *B23D 59/00*   (2006.01)
(52) U.S. Cl.
   CPC .......... *B27G 19/04* (2013.01); *B23D 59/001* (2013.01)

(58) Field of Classification Search
   CPC ...... B27G 19/04; B27G 19/02; B23D 59/001; B23D 51/02; B27B 9/00; B27B 9/04;
   (Continued)

(56) References Cited

U.S. PATENT DOCUMENTS 2,607,421 A * 8/1952 Anderson ................ B41K 3/38
                                                234/128
3,331,408 A    7/1967 Condit
(Continued)

FOREIGN PATENT DOCUMENTS

CN    102029436 A    4/2011
DE    2454040 A1    5/1975
(Continued)

OTHER PUBLICATIONS

German Examination Report in corresponding German Application No. 102018216933.0, dated May 23, 2019.
(Continued)

*Primary Examiner* — Ghassem Alie
(74) *Attorney, Agent, or Firm* — HSML P.C.

(57) ABSTRACT

A power tool, in particular a hand-held power tool, including a support section for setting down the power tool on a substrate, in particular on a workpiece and/or a guide element. The power tool has a support detection device and is designed to detect, by the support detection device, a first support state, in which the power tool is supported on the substrate by way of at least one first region of the support surface, and/or a second support state, in which the power tool is not resting on the substrate by way of at least the first region, and to determine an operating state of the power tool on the basis of the detected support state.

15 Claims, 12 Drawing Sheets

(58) Field of Classification Search
CPC ... B23Q 11/08; Y10T 83/544; Y10T 83/9372; Y10T 83/828
USPC ...... 30/166.3, 374, 391, 166, 276, 286, 382; 83/478, 397, 860, 520, 663
See application file for complete search history.

(56) References Cited

U.S. PATENT DOCUMENTS

| | | | | |
|---|---|---|---|---|
| 3,706,332 | A * | 12/1972 | George | B27G 19/04 |
| | | | | 30/391 |
| 3,721,141 | A * | 3/1973 | Frostad | B27G 19/04 |
| | | | | 144/251.1 |
| 3,922,785 | A | 12/1975 | Fushiya | |
| 4,219,747 | A | 8/1980 | Hornung et al. | |
| 4,252,239 | A * | 2/1981 | Snyder | B23D 57/0092 |
| | | | | 206/349 |
| 4,926,729 | A * | 5/1990 | Igarashi | B43M 7/005 |
| | | | | 414/412 |
| 5,758,425 | A * | 6/1998 | Gallagher | B27B 9/02 |
| | | | | 30/376 |
| 5,921,161 | A * | 7/1999 | Newell | B23Q 9/0078 |
| | | | | 83/486.1 |
| 5,941,151 | A * | 8/1999 | Amon | G05B 19/402 |
| | | | | 451/10 |
| 5,984,020 | A | 11/1999 | Meyer et al. | |
| 7,020,970 | B1 * | 4/2006 | Welch | B27G 19/04 |
| | | | | 83/478 |
| 8,833,221 | B2 | 9/2014 | Tomita et al. | |
| 2005/0145080 | A1 | 7/2005 | Voigtlaender | |
| 2005/0217124 | A1 | 10/2005 | Fuchs et al. | |
| 2010/0037739 | A1 | 2/2010 | Anderson et al. | |
| 2016/0046035 | A1 | 2/2016 | Laghate et al. | |
| 2016/0089810 | A1 | 3/2016 | Padmanabhan et al. | |
| 2018/0085837 | A1 | 3/2018 | Koegel et al. | |
| 2021/0323189 | A1 | 10/2021 | Wiker et al. | |

FOREIGN PATENT DOCUMENTS

| | | | | |
|---|---|---|---|---|
| DE | 3444414 | A1 | 6/1986 | |
| DE | 3535144 | A1 * | 4/1987 | ........... B23D 59/001 |
| DE | 102007041097 | A1 | 3/2008 | |
| DE | 102014209009 | A1 | 7/2015 | |
| DE | 102017211270 | A1 | 1/2019 | |
| EP | 2305439 | A2 | 4/2011 | |
| EP | 3260242 | A1 | 12/2017 | |
| EP | 3 648 936 | A1 | 5/2020 | |
| JP | 50-78998 | | 6/1975 | |
| JP | H06339806 | | * 12/1994 | ........... B26G 19/02 |
| JP | 2008155321 | A | 7/2008 | |
| JP | 2011000653 | A | 1/2011 | |
| JP | 2011-020205 | | 2/2011 | |
| JP | 5462575 | B2 | 4/2014 | |
| RU | 2540240 | C2 | 2/2015 | |
| WO | 2008028911 | A1 | 3/2008 | |
| WO | 2019/007593 | | 1/2019 | |

OTHER PUBLICATIONS

International Search Report and Written Opinion in corresponding PT Application No. PCT/EP2019/075596, dated Dec. 12, 2019.
First Office Action issued in corresponding European Patent Application No. 19782923.7, Feb. 8, 2023, 6 pages.
Office Action issued in corresponding Japanese Patent Application No. 2021-518110, Jan. 24, 2023, 10 pages w/ translation.
First Office Action issued in corresponding Chinese Patent Application No. 201980064747.4, Apr. 13, 2023, 19 pages w/translation.

* cited by examiner

ELECTRIC TOOL

The invention relates to an electric tool, in particular to a hand-guided electric tool, with a lay-on section for laying the electric tool onto an underlay, in particular onto a workpiece and/or onto a guide element.

BACKGROUND OF THE INVENTION

A machine tool monitoring device with a recognition unit for recognising an application situation at a machine tool is described in DE 10 2007 041 097 A1. The recognition unit recognises an application situation on the basis of at least one distance characteristic value.

SUMMARY OF THE INVENTION

An object of the invention lies in determining an operating state of the electric tool in a simple and reliable manner.

The object is achieved by an electric tool as disclosed in the specification. The electric tool comprises a lay-on detection device and is designed to detect, by way of the lay-on detection device, a first lay-on state, in which the electric tool lies with at least a first region of the lay-on section on the underlay, and/or a second lay-on state, in which the electric tool with at least the first region does not lie on the underlay, and to determine an operating state of the electric tool on the basis of the detected lay-on state.

As a result, the operating state is determined on the basis of a lying or non-lying of the electric tool on an underlay. It can be very simply detected whether the electric tool lies on the underlay or not. In particular, a distance recognition as is applied in the state of the art is not absolutely necessary for this.

In a preferred design, the detection of the first and/or second lay-on state is effected by way of a contact switch, in particular a mechanical switch, which can be actuated by the underlay in a direct or indirect manner. The contact switch can be actuated directly by way of the contact of the underlay or, alternatively to this, indirectly via one or more further elements, in particular via a lay-on detection section which directly contacts the underlay. The contact switch is expediently designed to differentiate two, in particular only two states from one another, in particular an actuated state and a non-actuated state.

The lay-on section expediently comprises a lay-on surface and/or a lay-on detection section. The lay-on detection section can be arranged in the lay-on surface and/or laterally of this and given a lying on the underlay can be actuated by the underlay. The lay-on detection section expediently serves for detecting the first and/or the second lay-on state.

The lay-on detection device is preferably designed to detect both lay-on states. In particular, the lay-on detection device is designed to determine whether the current lay-on state is the first lay-on state or the second lay-on state, and to determine the operating state on the basis of the currently detected lay-on state and/or on the basis of a previously detected lay-on state.

The terms "lay-on" and "lying" in particular are to be understood independently of the gravitation vector. A "lay-on" or a "lying" can be given in the direction of the gravitation vector and/or also in a direction which is different to the gravitation vector. For example, the electrical tool can be placed with the lay-on section, thus in particular with the lay-on surface and/or the lay-on detection section, from below onto a room ceiling and/or laterally onto a vertical wall.

The invention further relates to an electric tool, in particular to a stationary electric tool, with a lay-on section for the placing-on of a workpiece, wherein the electric tool comprises a lay-on detection device and is designed to detect, by way of the lay-on detection device, a first lay-on state, in which the workpiece lies on at least a first region of the lay-on section of the electric tool, and/or a second lay-on state, in which the workpiece does not lie on at least the first region of the lay-on section of the electric tool and to determine an operating state of the electric tool on the basis of the detected lay-on state.

Advantageous further developments are the subject-matter of the dependent claims.

The lay-on detection device for detecting the first and/or the second lay-on state preferably comprises a detection unit which in particular is designed as a mechanically actuatable detection unit, preferably as a contact switch.

The electric tool preferably comprises a lay-on detection section and the lay-on detection section is designed to detect the first and/or the second lay-on state on the basis of whether the lay-on detection section is actuated by the underlay.

The lay-on detection section is preferably arranged behind, in front of and/or in the region of a tool of the electric tool, in the feed direction.

The lay-on section preferably comprises a lay-on surface and the lay-on detection section is movably mounted relative to the lay-on surface.

The electric tool preferably comprises a drive section for driving the tool, on which drive section a/the detection unit is arranged.

The lay-on detection device preferably comprises a coupling mechanism, via which the lay-on detection section is mechanically coupled to the detection unit, in order to mechanically actuate the detection unit in dependence on whether the electric tool is situated in a first lay-on state or the second lay-on state.

The coupling mechanism preferably comprises a coupling element which is movably mounted on the drive section.

The electric tool preferably comprises a first joint, via which the drive section together with the detection unit can be displaced relative to the lay-on section into different first positions.

The coupling mechanism is preferably designed to provide the mechanical coupling between the lay-on detection section and the detection unit invariantly to the first positions, so that the lay-on detection device correctly detects the first and/or second lay-on state in different first positions of the drive section.

Preferably, the first joint is a first pivot joint and the coupling mechanism comprises an actuation section which can be actuated by the lay-on detection section and/or the underlay and which is designed concentrically to a pivot axis of the first pivot joint.

The electric tool preferably comprises a second joint, via which the drive section together with the detection unit can be brought into different section positions relative to the lay-on section, wherein the coupling mechanism is designed to provide the mechanical coupling between the lay-on detection section and the detection unit invariantly to the second positions, so that the lay-on detection device correctly detects the first and/or the second lay-on state in different second positions of the drive section.

Preferably, the second joint is a second pivot joint and the actuation section is designed concentrically to a pivot axis of the second pivot joint.

The electric tool is preferably designed to determine an error state, in particular a kickback state and/or a machining state, as the operating state.

The electric tool is preferably designed, on determining the operating state, to take into account, additionally to the detected lay-on state, one or more further input variables, in particular a distance, a force, a pressure, a moment, an acceleration, a rotation rate, a current, a voltage, a speed, a torque, a temperature and/or a sound.

The electric tool is preferably designed to detect the further input variable depending on the detected lay-on state.

The electric tool is preferably designed, as a reaction to the detected operating state, to deactivate the drive of the tool, to stop the tool and/or to bring the tool into a safety position.

Preferably, the electric tool is designed, on determining the operating state, to take into account the currently detected lay-on state and a previously detected lay-on state, in particular a lay-on state change from the previously detected lay-on state to the currently detected lay-on state.

The electric tool is preferably designed to determine a kickback state as the operating state, and specifically depending on whether the following conditions are cumulatively fulfilled: the lay-on detection device detects the second lay-on state; the lay-on detection device has detected the first lay-on state before the second lay-on state; a current which is related to the motor which drives the tool lies above a predefined threshold value.

BRIEF DESCRIPTION OF THE DRAWINGS

Exemplary embodiments and exemplary details are hereinafter explained with reference to the figures. Herein are shown.

DETAILED DESCRIPTION OF THE INVENTION

Figure 1:
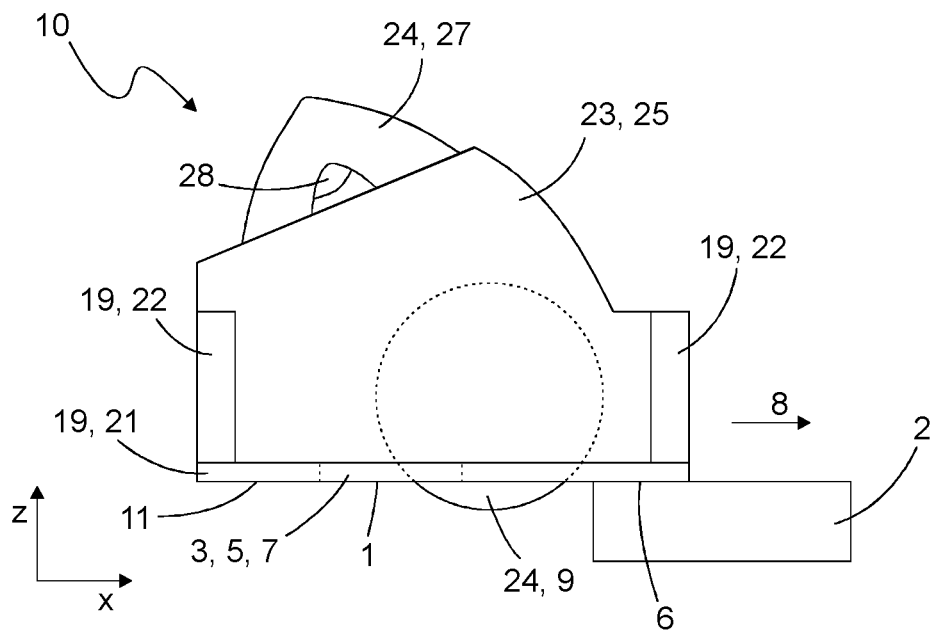
FIG. 1 a schematic lateral view of a hand-held electric tool.

An electric tool 10 which by way of example is designed as a hand-guided electric tool is shown in FIG. 1. The electric tool 10 comprises a lay-on section 1 for placing the electric tool 10 onto an underlay 2, in particular onto a workpiece and/or a guide element.

The electric tool 10 comprises a lay-on detection device 3 and is designed to detect, by way of the lay-on detection device 3, a first lay-on state, in which the electric tool 10 lies with at least a first region 5 of the lay-on section 1 on the underlay 2, and/or a second lay-on state, in which the electric tool 10 does not lie with at least the first region 5 on the underlay 2 and to determine an operating state of the electric tool 10 on the basis of the detected lay-on state.

Further exemplary details are explained hereinafter. Hereby, in particular one refers to the x-direction, y-direction and z-direction which are drawn in the figures and which are aligned orthogonally to one another. The x-direction can also be denoted as a longitudinal direction, the y-direction as a transverse direction, and the z-direction as a height direction.

Firstly with regard to the basic construction:

The electric tool 10 by way of example comprises a rotatable tool 9, for example a saw blade. The electric tool 10 by way of example is designed as a saw, in particular a hand-held circular saw, preferably a plunge saw. Alternatively, the electric tool 10 can also comprise a miller or a grinding disc and be designed for example as a jointer or an angle grinder.

The lay-on section 1 preferably comprises a lay-on surface 11 and/or a lay-on detection section 7. The lay-on section 1, in particular the lay-on surface 11, of the electric tool 10 is expediently directed downwards given a designated alignment of the electric tool 10. The lay-on section 1 can also be aligned upwards or laterally depending on the use of the electric tool 10, for example on machining a ceiling or a vertical wall. By way of example, the lay-on section 1, in particular the lay-on surface 11 is aligned normally to the z-direction. The lay-on section 1, in particular the lay-on surface 11 preferably spans an x-y plane. The tool 9 expediently extends further to the bottom in the z-direction than the lay-on surface 11. The tool 9 projects downwards beyond the lay-on section 1 in the z-direction. The lay-on section 1, in particular the lay-on surface 11, and the tool 9 are arranged relative to one another in a manner such that given designated operation, in which the tool 9 machines the workpiece and in particular is plunged into the workpiece, the lay-on section 1, in particular the lay-on surface 11, expediently lies on the workpiece and/or on a guide device, in particular on a guide rail.

The electric tool 10 is expediently designed in a manner such that for machining the workpiece, it is moved relative to the workpiece in a feed direction 8, in particular in a manual manner by a user. The feed direction 8 by way of example is aligned parallel to the x-direction. Given the movement of the electric tool 10 relative to the workpiece, the electric tool 10 lies with its lay-on section 1, in particular with the lay-on surface 11, on the workpiece and/or on a guide rail which in particular lies on the workpiece. The lay-on section 1, in particular the lay-on surface 11 is designed in a manner such that it can be displaced relative to the workpiece and/or to the guide rail in the feed direction 8 in a state lying on the workpiece and/or on the guide rail. Expediently, the lay-on section 1, in particular the lay-on surface 11 is designed in an essentially plane manner in the feed direction 8.

The tool 9 is expediently movably mounted relative to the lay-on section 1, in particular to the lay-on surface 11, so that it can be changed in its position relative to the lay-on section 1, in particular the lay-on surface 11. Expediently, the tool 9 can be pivoted relative to the lay-on section 1 about a first pivot axis and/or a second pivot axis which in particular is aligned orthogonally to the first pivot axis. The second pivot axis by way of example is aligned parallel to the x-axis. The alignment of the first pivot axis is expediently dependent on the pivoting position about the second pivot axis. In a normal position with respect to the second pivot axis, the first pivot axis is expediently aligned parallel to the y-direction.

The first and/or second pivot axis does not necessary need to be physically present. The pivoting about one or both of these pivot axes can expediently also be effected by way of one or more guide mechanisms.

Alternatively to the design with the first and/or second pivot axis, said design being described above, the electric tool can also be designed in a manner such that the tool 9 is not pivotable relative to the lay-on section 1, in particular to the lay-on surface 11

In the exemplary case, in which the electric tool 10 is designed as a saw, in particular as a plunge saw, the plunge depth of the saw blade—thus how far the saw blade projects downwards beyond the lay-on section 1 in the z-direction—can be adjusted by way of pivoting the tool 9 which is designed as a saw blade, about the first pivot axis. Alternatively or additionally, the mitre angle—thus the angle between the saw blade plane and the lay-on section 1—can be adjusted by way of a pivoting about the second pivot axis.

According to an exemplary design, the electric tool 10 comprises a base section 19 which comprises a base plate 21 and/or second joint sections 22. The surface of the base plate 21 which is aligned downwards in the z-direction and which is expediently the largest with regard to area expediently provides the lay-on section 1 or a part of the lay-on section 1, in particular the lay-on surface 11. The second joint sections 22 expediently project upwards from the base plate 21 in the z-direction. The second joint sections 22 by way of example are arranged distanced to one another in the x-direction.

The electric tool 10 by way of example comprises a mitre section 23 which is pivotably mounted relative to the base section 19 about the aforementioned second pivot axis. The mitre section 23 by way of example comprises a first joint section 25 and a plunge section 24. Expediently, on pivoting the mitre section 23, the first joint section 25 and/or the plunge section 24 are pivoted together relative to the base section 19.

The first joint section 25 is expediently situated between the second joint sections 22 in the x-direction and in particular is pivotably mounted on the second joint sections 22 about the second pivot axis. The first joint section 25 preferably extends upwards from the base plate 21 in the z-direction.

The plunge section 24 is expediently pivotably mounted relative to the first joint section 25 about the aforementioned first pivot axis. The plunge section 24 by way of example comprises the tool 9, a drive section 26 and/or a grip 27. Expediently, on pivoting the plunge section 24 relative to the first joint section 25, the tool 9, the drive section 26 and/or the grip 27 are pivoted together relative to the first joint section 25.

The drive section 26 expediently comprises a drive unit, for example a motor, in particular an electric motor and/or a gear, for the drive of the tool 9. The drive section 26 expediently further comprises a control unit, for example an electronics arrangement, for the control of the drive unit.

The drive section 26 by way of example projects away from the first joint section 25 in the y-direction. The drive section 26 is preferably arranged above the lay-on surface 1 in the z-direction. The drive section 26 by way of example is pivotable relative to the lay-on section 1, in particular to the lay-on surface 11, about the first and/or second pivot axis; and thus can be changed in its position relative to the lay-on section 1.

By way of example, the grip 27 projects upwards away from the drive section 26 in the z-direction. By way of example, an operating device 28, for example a button, via which a user can control the drive of the tool 9, is arranged on the grip 27.

Figure 12:
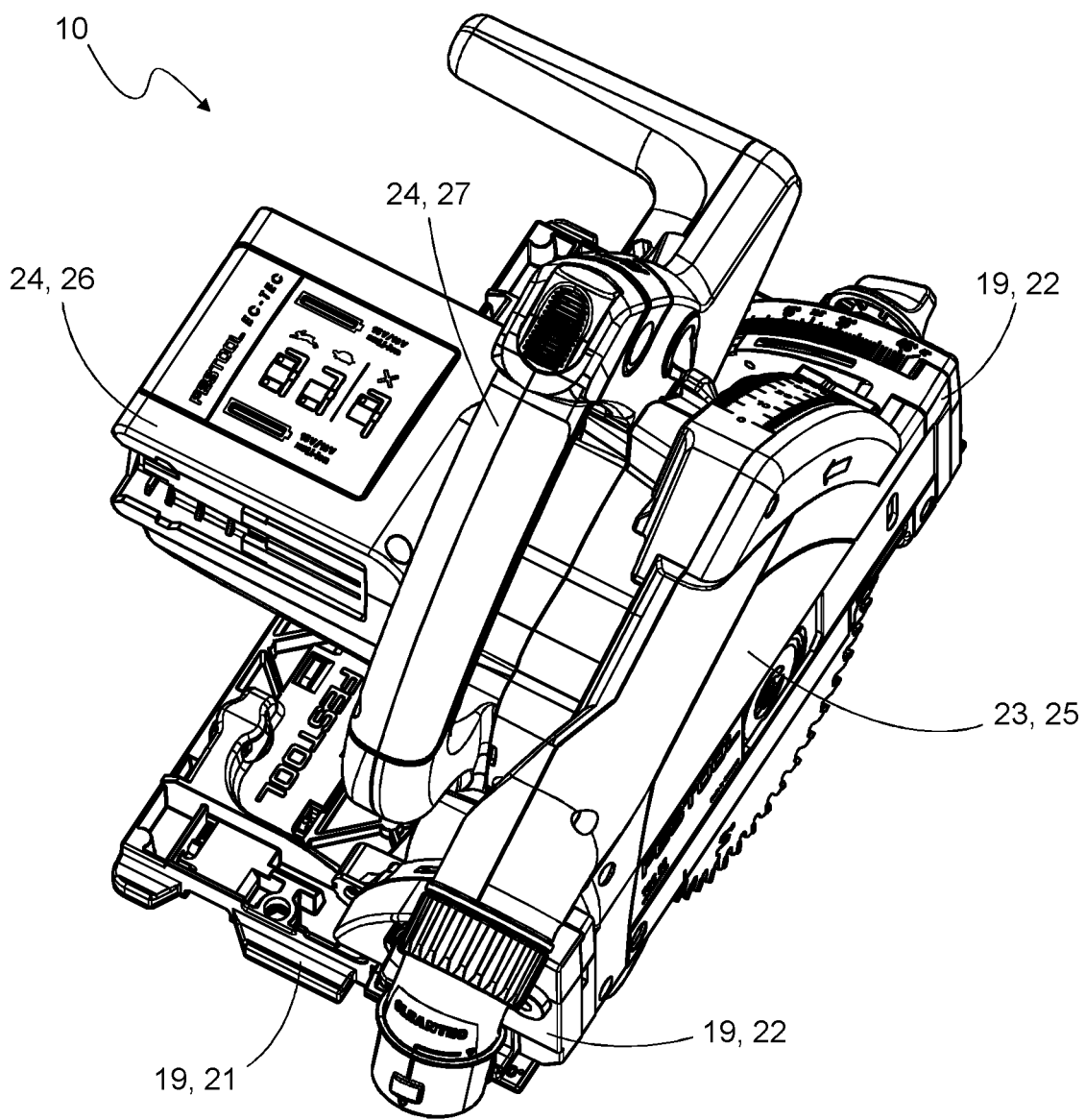

An exemplary design of the electric tool 10 with a base section 19, a mitre section 23, a plunge section 24 and a drive section 26 in particular is also shown in FIG. 12.

The lay-on detection device 3 is to be dealt with next.

The lay-on detection device 3 can be designed in particular according to one of the subsequently explained variants which are shown by way of example in FIGS. 3 to 11.

The features which can be present with all three variants (or also other variants) are to be firstly dealt with.

The lay-on detection device 3 for detecting the first and/or the second lay-on state expediently comprises a detection unit 4. The detection unit 4 is preferably mechanically actuatable. The detection unit 4 in particular is designed as a pressable switch, in particular as a mechanically pressable contact switch. Expediently, an electrical connection is opened or closed by way of pressing the contact switch. The electric tool 10 is expediently designed to detect the actuation of the detection unit 4, in particular by way of the aforementioned control unit. According to a preferred design, the detection unit 4 can only detect two difference states.

The lay-on detection device 3 in particular is designed in a manner such that in the first lay-on state the detection unit 4 is mechanically actuated by the underlay 2, in particular in a direct or indirect manner, and/or in the second lay-on state the detection unit 4 is not mechanically actuated by the underlay 2, in particular not directly or indirectly. Inasmuch as the detection unit 4 is designed as a contact switch, in the first lay-on state the contact switch is pressed by the underlay 2, in particular in a direct or indirect manner, and/or in the second lay-on state is not pressed by the underlay 2, in particular not directly or indirectly. The dependency between the lay-on state and the actuation of the detection unit 4 can also be a dependency which is reverse to the aforementioned dependency.

Alternatively or additionally to the aforementioned design, the detection unit 4 can also comprise a distance sensor, force sensor, pressure sensor, camera, magnetic field sensor, acceleration sensor, rotation rate sensor and/or a moment sensor. In particular, the detection unit 4 can be designed, amid the use of one or more of the aforementioned sensors, to determine the first lay-on state, the second lay-on state and/or the operating state of the electric tool 10.

The electric tool 10 expediently comprises a lay-on detection section 7. The lay-on detection section 7 in particular is part of the lay-on detection device 3. The lay-on detection device 3 is designed to detect the first and/or the second lay-on state on the basis of whether the lay-on detection section 7 is actuated by the underlay 2. The lay-on detection section 7 is expediently part of the lay-on section 1. The lay-on detection section 7 in particular can be arranged within the lay-on surface 11 or next to the lay-on surface 11.

The lay-on detection section 7 is preferably arranged in a manner such that in particular in the second lay-on state, it extends further downwards in the z-direction than the lay-on surface 11. In particular, the lay-on detection section 7 is arranged in a manner such that when laying the lay-on section 1 on the underlay 2, the lay-on detection section 7 is actuated by the underlay 2.

The lay-on detection section 7 is movably mounted relative to the lay-on surface 11. In particular, the lay-on detection section 7 is mounted in a manner such that when laying the lay-on section 1 on the underlay 2, the lay-on detection section 7 moves relative to the lay-on surface 11. The lay-on detection section 7 in particular is mounted in a pivotably and/or linearly movable manner. The lay-on detection section 7 in particular can be brought into a first and second position. Expediently, the lay-on detection section 7 in the first position does not extend further downwards in the z-direction than the lay-on surface 11 and in the second position extends further downwards in the z-direction than the lay-on surface 11.

The lay-on detection section 7 can expediently be brought from the first position into the second position by way of actuation by the underlay 2. Expediently, the lay-on detection device 3 can comprise a return element, for example a spring element, which urges or brings the lay-on detection section 7 into the second position, in particular when the electric tool 10 is situated in the second lay-on state and/or the lay-on detection section 7 is not actuated by the underlay 2.

The lay-on detection section 7 can be part of the lay-on surface 11 or be provided additionally to the lay-on surface 11. The lay-on detection section 7 expediently assumes the same x-y region as the lay-on surface 11, or another x-y region. The lay-on detection section 7 in particular can be arranged laterally, for example in the y-direction, next to the lay-on surface 11. Furthermore, the lay-on detection section 7 can be arranged in a recess, for example an opening or a slot, of the lay-on surface 11.

The lower side of the lay-on detection section 7 is preferably sloped with respect to the lay-on surface 11. The lower side of the lay-on detection section 7 in particular is designed as a chamfer. In the x-z section, the lower side of the lay-on detection section 7 coming from the lay-on surface 11 runs diagonally downwards and in particular in the direction which is opposite to the feed direction 8. In the x-z section, the course of the lower side is expediently continuous. In this manner, one can ensure that the electric tool 10 can be pushed onto the underlay 2 in the feed direction 8, without the lay-on detection section 7 herein being of a hindrance.

The lay-on detection section 7 is arranged behind, in front of and/or in the region of the tool 9 in the feed direction. In a preferred design, the lay-on detection section 7 is arranged behind the tool 9 in the feed direction 8. Preferably, only one lay-on detection section 7 is present. Alternatively to this, several lay-on detection sections 7 can also be present, and these are particularly arranged in a manner distributed in the x-direction and/or the y-direction.

Expediently, the lay-on detection section 7 only extends over a part-region of the x-extension of the electric tool 10, in particular a part-region of the x-extension of the lay-on section 1. The x part-region of the lay-on region 1, in which the lay-on detection section 7 is present, is expediently the first region 5. The x part-region, in which the lay-on detection section 7 is not present, is also to be denoted as a second region 6.

Alternatively to this, the lay-on detection section 7 can also extend over the entire x-extension of the lay-on section 1, in particular of the lay-on surface 11. According to a possible design, the lay-on surface 1, in particular the entire lay-on surface 1 can represent the lay-on detection section 7.

The lay-on detection device 3 comprises a coupling mechanism 12, via which the lay-on detection section 7 is mechanically coupled to the detection unit 4. The detection unit 4 is mechanically activated via the coupling mechanism 12 in dependence on whether the electric tool 10 is situated on the first lay-on state or the second lay-on state. By way of example, the detection unit 4 is mechanically actuated by the coupling mechanism 12 in the first lay-on state and is not mechanically actuated by the coupling mechanism 12 in the second lay-on state. Alternatively to this, the coupling mechanism 12 can also be designed in a manner such that the detection unit 4 is not actuated in the first lay-on state and is actuated in the second lay-on state.

The detection unit 4 is expediently arranged on the drive section 26. The detection unit 4 is preferably communicatively and/or electrically connected to the control unit which is arranged by way of example on the drive section 26. The drive section 26 by way of example is arranged distanced to the lay-on section 1, in particular the lay-on surface 11 and/or the lay-on detection section 7. By way of example, the drive section 26 is arranged above the lay-on section 1, in particular above the base plate 21, in the z-direction. The coupling mechanism 12 in particular serves for mechanically transmitting a mechanical activation which is effected by way of the laying of the lay-on section 1, in particular the lay-on surface 11 and/or the lay-on detection section 7 onto the underlay 2, to the control unit which is located in the drive section 26.

The coupling mechanism 12 expediently comprises a coupling element 14 which in particular is movably mounted on the drive section 26. The coupling element 14 in particular can be designed as a lever element. The lay-on detection section 7 can be part of the coupling element 14. Alternatively to this, the lay-on detection section 7 can also be provided additionally to the coupling element 14.

Expediently, the drive section 26 is movably mounted relative to the lay-on section 1, for example about the already aforementioned first and/or section pivot axis.

The electric tool 10 by way of example comprises a first joint 15, via which the drive section 26 together with the detection unit 4 can be brought into different first positions relative to the lay-on section 1. The first joint in particular is a first pivot joint, preferably for providing the pivoting about the first pivot axis. The first joint 15 can also be denoted as a plunge joint.

The coupling mechanism 12 is preferably designed to provide the mechanical coupling between the lay-on detection section 7 and the detection unit 4 invariantly to the first positions, so that the lay-on detection device 3 correctly detects the first and/or second lay-on state in different first positions of the drive section 26. Expediently, the coupling mechanism 12 comprises an actuation section 16 which can be actuated by the lay-on detection section 7 and/or the underlay 2 and which is designed concentrically to the pivot axis of the first pivot joint 15.

The electric tool 10 by way of example comprises a second joint, via which the drive section 26 together with the detection unit 4 can be brought into different second positions relative to the lay-on section 1. The second joint in particular is a second pivot joint, preferably for providing the pivoting about the second pivot axis. The second joint can then also be denoted as a mitre joint.

The coupling mechanism 12 is preferably designed to provide the mechanical coupling between the lay-on detection section 7 and the detection unit 4 invariantly to the second positions, so that the lay-on detection device 7 correctly detects the first and/or second lay-on state in different second positions of the drive section 26. By way of example, the actuation section 16 is designed concentrically to the pivot axis of the second pivot joint.

Different variants of the lay-on detection device 3 are to be dealt with hereinafter in more detail with reference to the FIGS. 2 to 11. Only part-regions or details of the electrical tool 10 are shown in FIGS. 2 to 11 for reasons of an improved representation. Furthermore, a part of the tool 9 has been omitted in some figures for reason of the improved representation.

Figure 2:
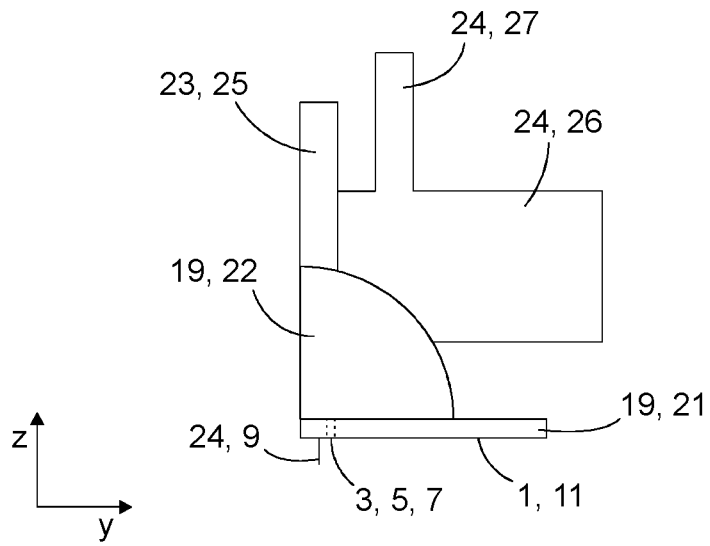
FIG. 2 a schematic front view of the hand-held electric tool.
Figure 3:
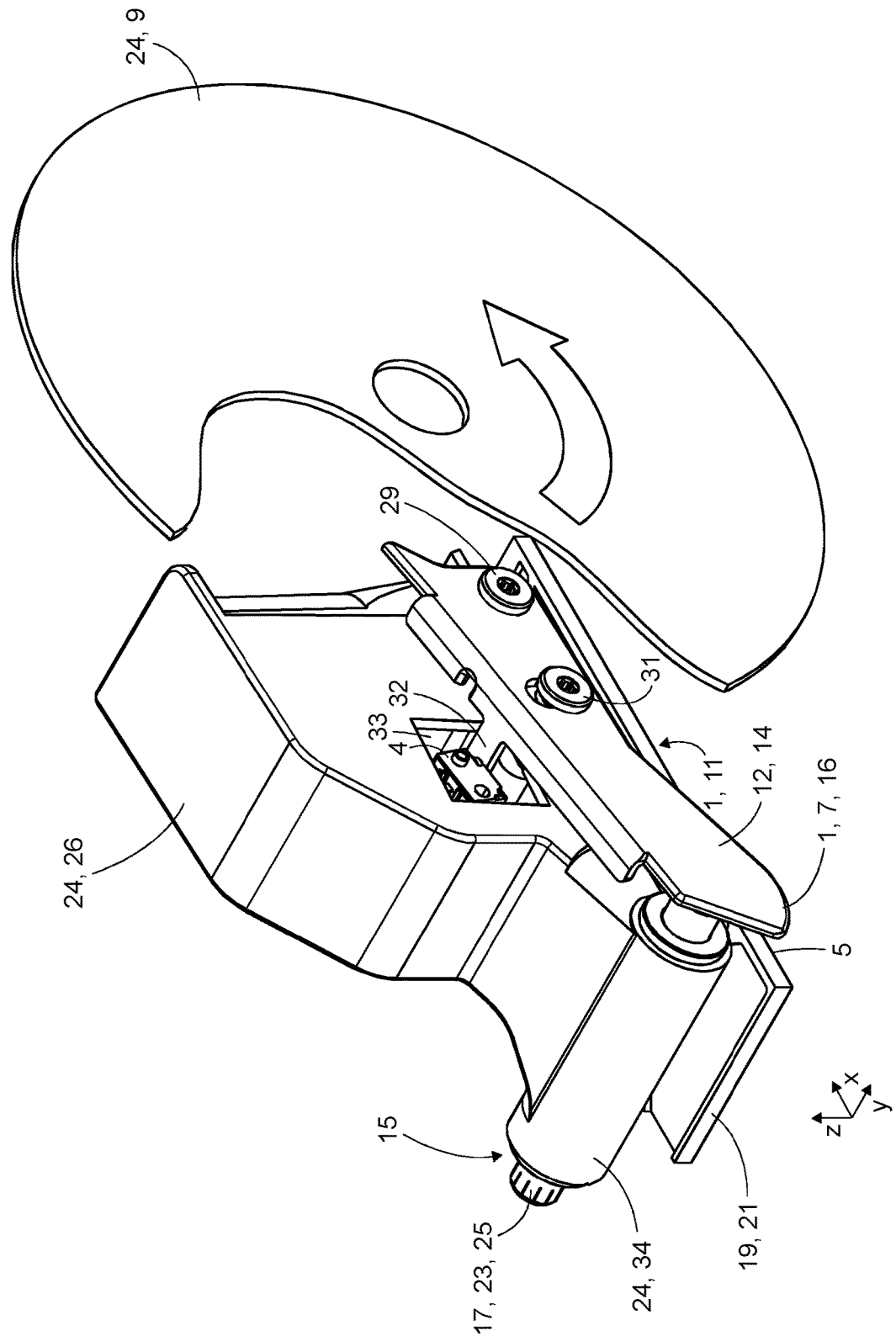
FIG. 3 a perspective view of a part-region of the hand-held electric tool with a lay-on detection device according to the first variant, FIG. 4 a lateral view of the part-region, wherein the hand-held electric tool is situated in a first lay-on state, FIG. 5 a perspective view of a part-region of the hand-held electric tool with a lay-on detection device according to a second variant, FIG. 6 a lateral view of the part-region, wherein the hand-held electric tool is situated in a first lay-on state, FIG. 7 a lateral view of the part-region, wherein a plunge section of the electric tool is pivoted about a first pivot axis, FIG. 8 a lateral view of the part-region, wherein the hand-held electric tool is situated in the second lay-on state, FIG. 9 a section front view of the part-region, FIG. 10 a section front view of the part-region, wherein a mitre section is pivoted about a second pivot axis, FIG. 11 a sectioned front view of a part-region of the hand-held electric tool with a lay-on detection device according to a third variant, FIG. 12 a perspective view of a hand-held electric tool, FIG. 13 a schematic section of a stationary electric tool.

A first variant is shown in FIGS. 2 and 3. Concerning the first variant, the lay-on detection section 7 is part of the coupling element 14. The coupling element 14 here is arranged in a manner such that given a lying of the lay-on surface 11 on the underlay 2, it directly contacts the underlay 2 and is directly actuated by the underlay 2.

The coupling element 14 by way of example is designed as an elongate, in particular strip-like element, in particular as a lever element. The side of the coupling element 14, which is the largest area-wise, by way of example is aligned normally to the y-direction. Expediently, the coupling element 14 with its longitudinal axis is aligned in an x-z direction and extends from a z-region of the lay-on surface 11 to the z-region of the drive section 26. In particular, the coupling element 14 extends diagonally upwards. The lay-on detection section 7 is formed by an end section of the coupling element 14, in particular exclusively by the end section. The coupling element 14 by way of example is located in a y-region between the lay-on surface 11, in particular the base plate 21, and the tool 9. By way of example, the lay-on detection section 7 is arranged behind the tool 9 in the feed direction 9.

The coupling element 14 by way of example is pivotably mounted on the drive section 26, preferably about a pivot axis which is aligned parallel to the rotation axis of the tool 9. By way of example, the pivot angle of the coupling section 14 is limited. By way of example, the coupling element 14 is pivotably mounted on the drive section 26 via a physically present pivot axis 29, for example a screw. The limitation of the pivot angle by way of example is effected via a limitation element 31 which is guided in a groove and which is expediently designed as a screw. The groove is preferably arranged in the coupling element 14 and the limitation element is preferably fastened to the drive section 26.

The coupling element 14 by way of example comprises an actuation projection 32 which extends to the drive section 26. In the normal position of the mitre section 23, the actuation projection 32 by way of example runs in the y-direction. The detection unit 4 is actuated via the actuation projection 32.

By way of example, a recess 33 is provided in the drive section 26, into which recess the detection unit 4, in particular a mechanically actuatable detection unit, preferably a contact switch, is arranged. The coupling element 14, in particular the actuation projection 32, projects into the recess 33.

By way of example, the plunge section 24, thus in particular the drive section 26 and/or the tool 9 is pivotably mounted relative to the lay-on section 1, in particular to the lay-on surface 11, about the first pivot axis. This pivotable mounting by way of example is provided by the first joint 15. The drive section 26 can be brought into different first positions relative to the lay-on section 1 via the first joint 15. The first joint 15 by way of example is formed by a bushing 34 and a (physically present) pivot axis 17, for example a bolt which is inserted into the bushing 34. The bushing 34 is expediently part of the plunge section 24 and the pivot axis 17 is preferably part of the first joint section 25.

The coupling mechanism 12 is designed in a manner such that the lay-on detection device 3 also correctly detects the first and/or second lay-on state in different first positions of the drive section 26. For this purpose, an actuation section 16 which is designed concentrically to the pivot axis 17 of the first pivot joint and which can be actuated by the underlay 2 is present on the coupling element 14.

By way of example, the actuation section 16 is provided by the lay-on detection section 7. Expediently, the actuation section 16 is formed by a rounded end section of the coupling element 14. By way of example, the actuation section 16 is a circle segment whose circle middle point lies on the pivot axis 17. Preferably, the distance between the point of the actuation section 16 which is lowermost in the z-direction and the lay-on surface 11 remains the same at different, preferably all first positions, so that given a laying of the lay-on surface 11 and of the lay-on detection section 7 on the underlay 2, the lay-on detection section 7 experiences the same actuation, in particular the same actuation travel, at different, preferably all first positions of the drive section 26.

Figure 4:
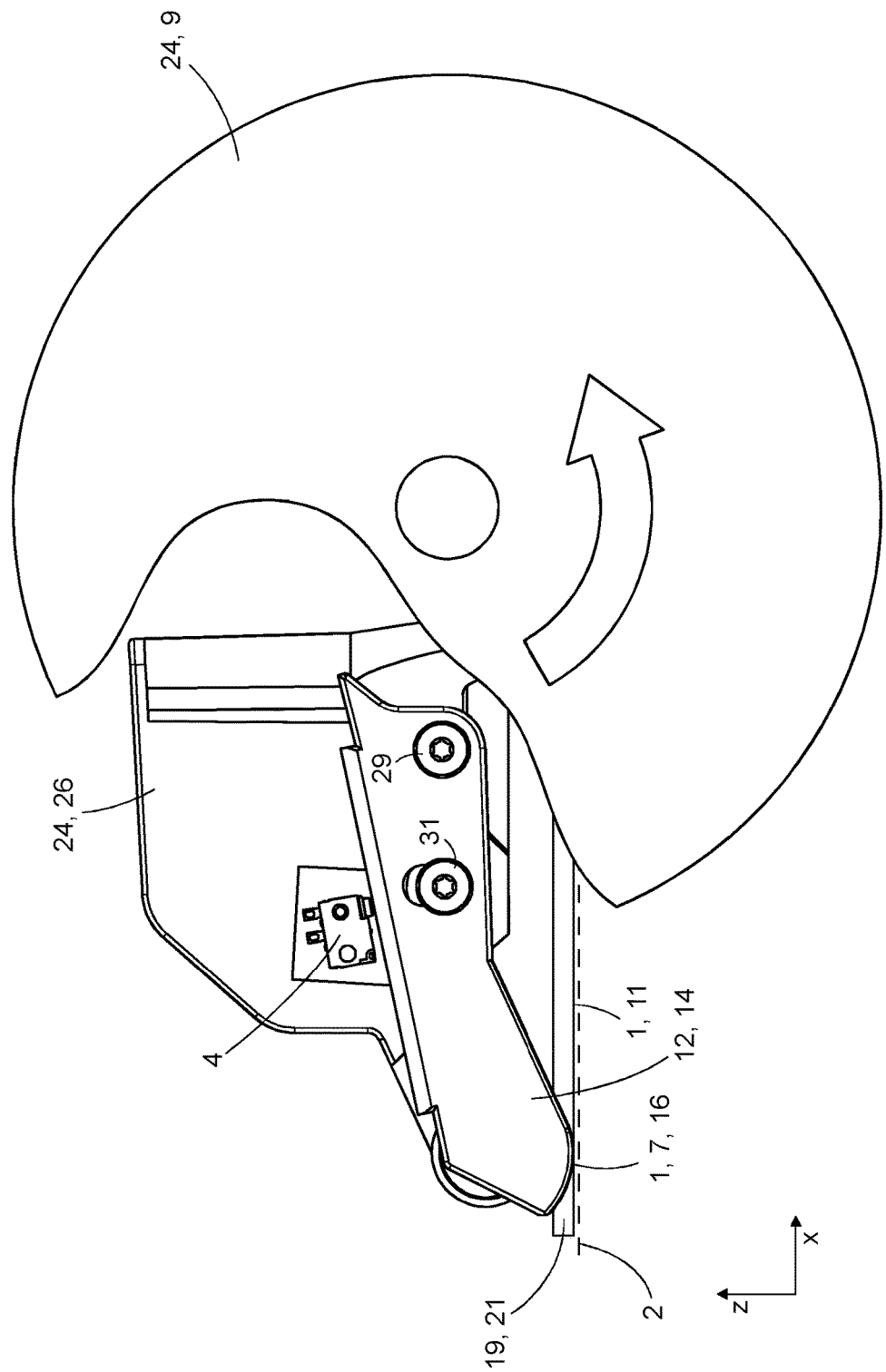
Figure 5:
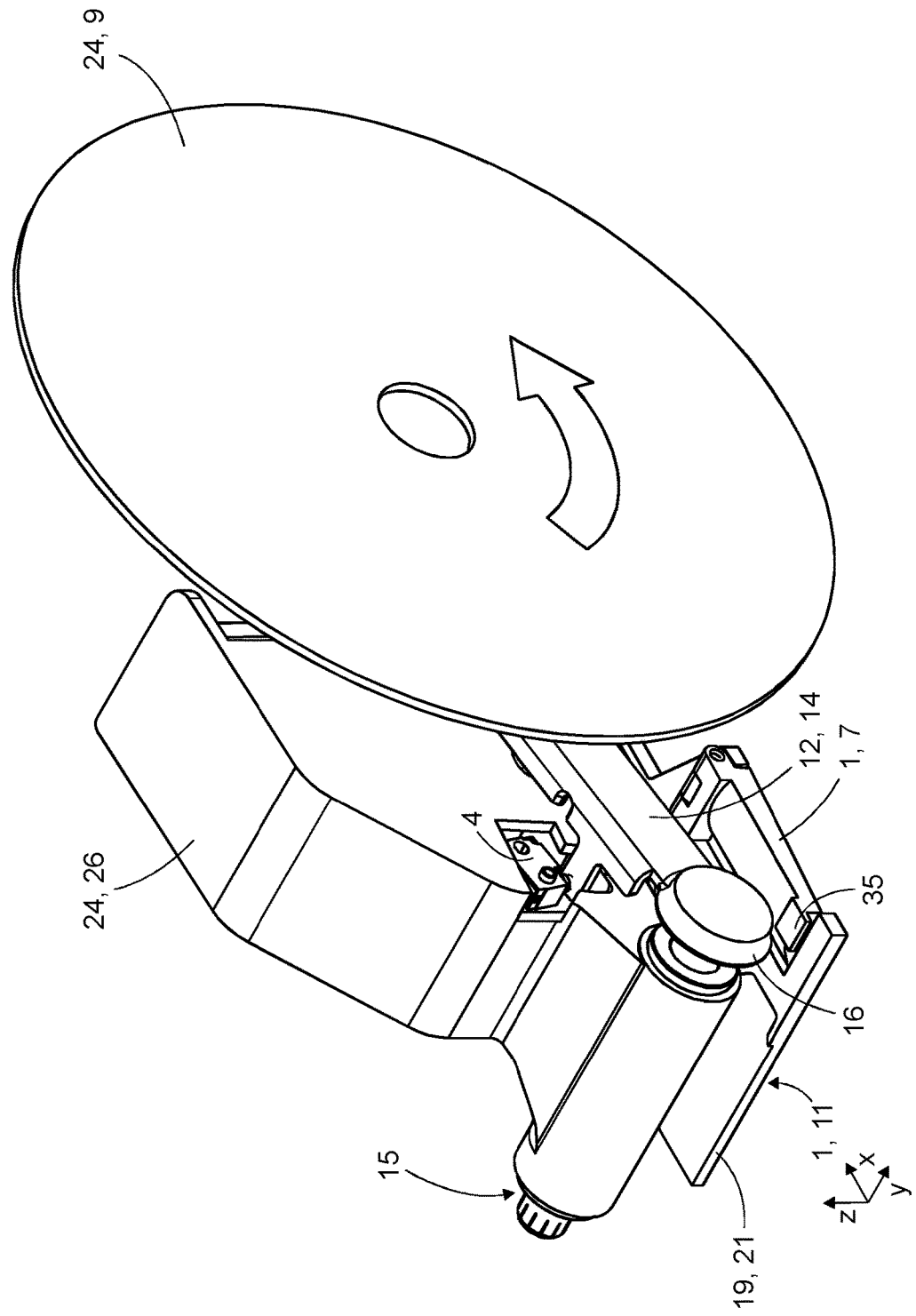

FIG. 4 shows the first lay-on state. Here, the electric tool 10 lies with the lay-on section 1, in particular the lay-on surface 11, on the underlay 2. The lay-on detection section 7 is actuated by the underlay 2, by way of example is pressed upwards in the z-direction. The actuation of the lay-on detection section 7 is mechanically transferred onto the detection unit 4 in the drive section 26 via the coupling mechanism 12. Since the lay-on detection section 7 contacts the underlay 2 with its circle segment shaped actuation section 16 which is designed concentrically to the pivot axis 17, the actuation of the actuation section 16 is not influenced by a pivoting about the pivot axis 17, thus is invariant with respect to such a pivoting.

A second variant of the lay-on detection device 3 is to be dealt with hereinafter with reference to the FIGS. 5 to 10.

The second variant differs from the first variant in that the lay-on detection section 7 is present additionally to the coupling element 14—thus the lay-on detection section 7 and the coupling element 14 are two different elements. Apart from this difference, the second variant expediently corresponds to the first variant discussed above, in one, several or all of the aspects which have been discussed above.

The lay-on detection section 7 by way of example is attached to the base plate 21 and/or relative to the base plate 21, in a movable manner, in particular a pivotably manner, expediently about a pivot axis parallel to the y-direction. The lay-on detection section 7 is expediently designed in an elongate manner and is aligned with its longitudinal axis in the x-direction. The lay-on detection section 7 is expediently arranged in a recess of the base plate 21. The lay-on detection section 7 with a first end section is articulated by way of example on the base plate 21. The lay-on detection section 7 comprises a projection 35 on a second end section and this projection 35 delimits a pivoting of the lay-on detection section 7 to the bottom. Expediently, the projection 35 is in engagement with the upper side of the base plate 21 given a maximal pivoting position of the lay-on detection section 7.

The lay-on detection section 7 is mechanically coupled to the actuation section 16 of the coupling element 14. By way of example, the actuation section 16 contacts the lay-on detection section 7. The actuation section 16, as described above in the context of the first variant, is designed concentrically to the first pivot axis 17, so that the actuation of the coupling element 14 is independent of the first pivoting position of the drive section 26. By way of example, the actuation section 16 here is designed in a circular manner.

Figure 6:
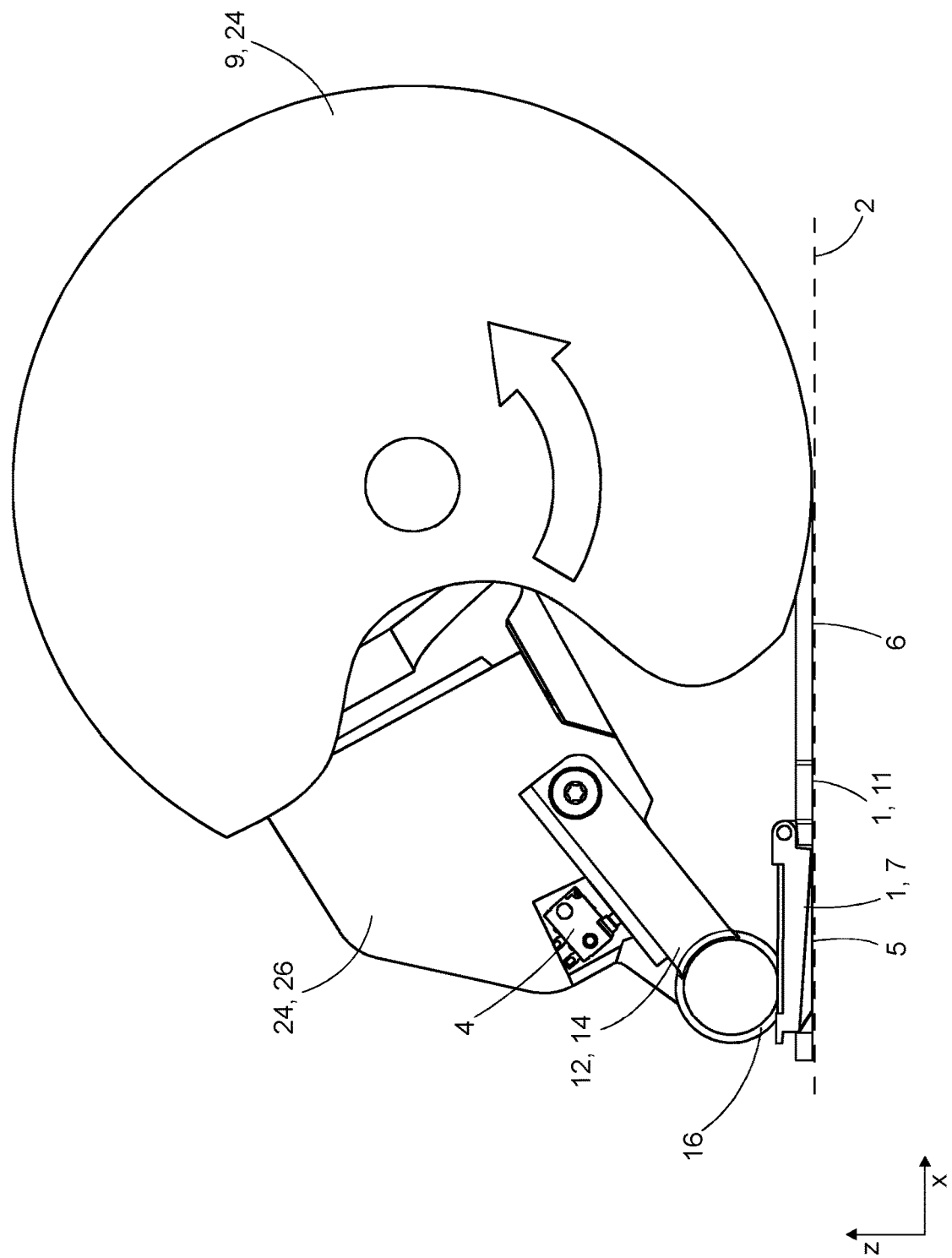

FIG. 6 shows the first lay-on state. The lay-on section 1, in particular the lay-on surface 11, lies on the underlay 2. The lay-on detection section 7 is actuated by the underlay 2, in particular in a direct manner and is hence pressed upwards. The lay-on detection section 7 in this state expediently does not project further to the bottom than the lay-on surface 11. Expediently, the lower side of the lay-on detection section 7 is flush with the lay-on surface 11 in the z-direction.

The actuation of the lay-on detection section 7 is transferred via the coupling mechanism 12, by way of example via the coupling element 14, to the detection unit 4.

Figure 7:
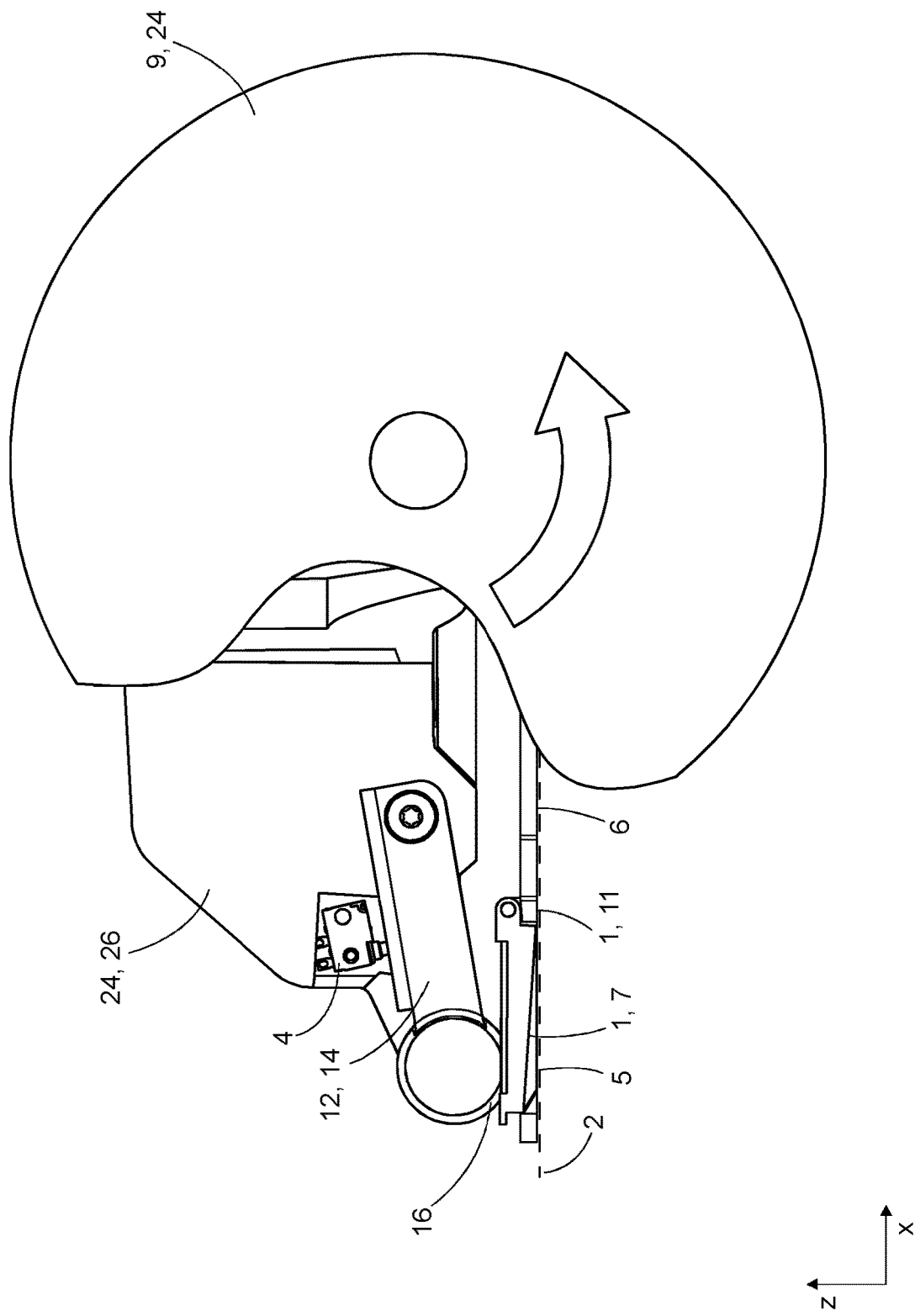

FIG. 7 likewise shows the first lay-on state. The plunge section 24 in FIG. 7 is located in a different pivoting position than in FIG. 6. Since the actuation section 16 is designed concentrically to the first pivot axis 17, the actuation of the actuation section 16 which is effected by the lay-on detection section 7 is independent on the pivoting position about the first pivot axis 17.

Figure 8:
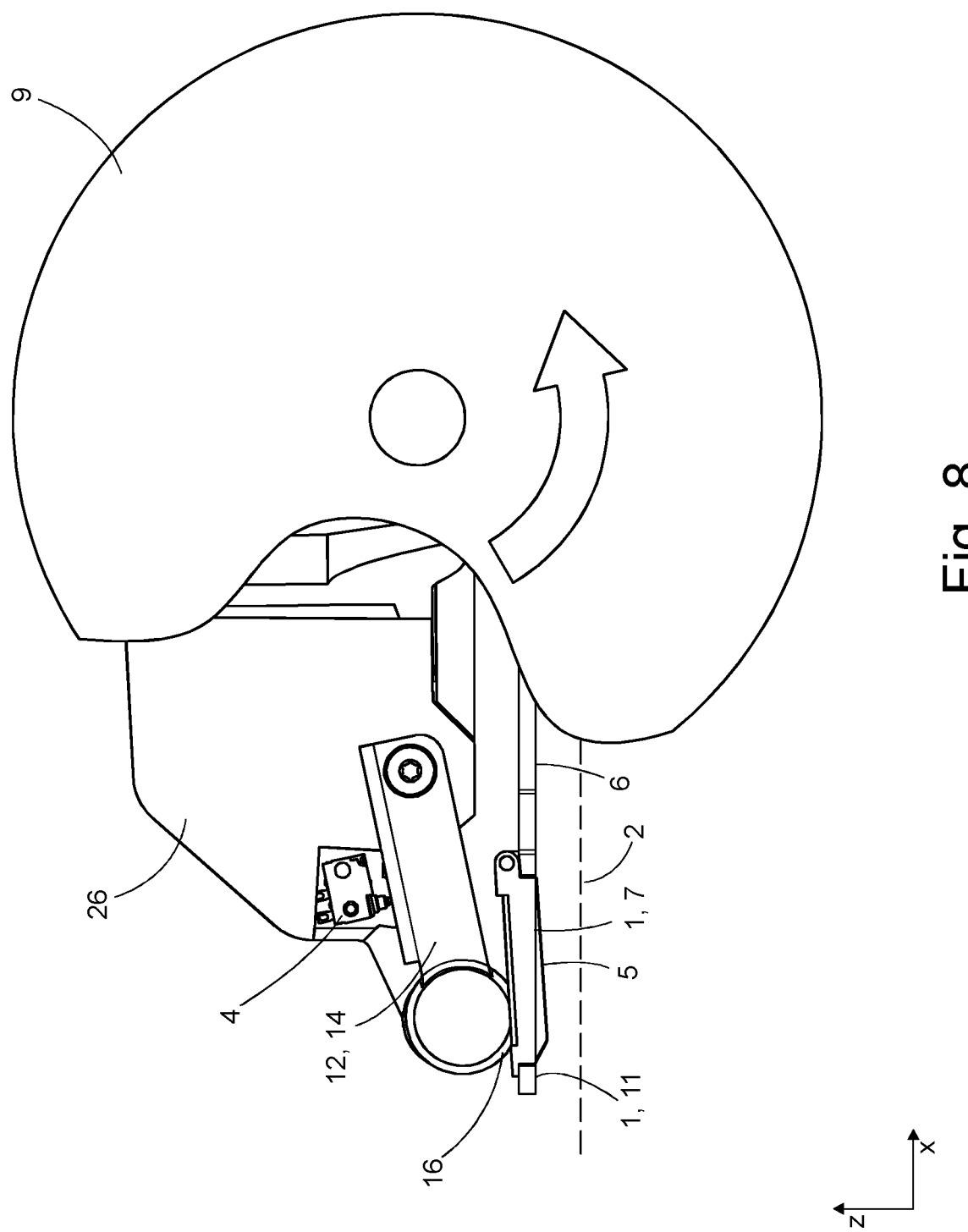

FIG. 8 shows the second lay-on state. The lay-on detection section 7 is not actuated by the underlay 2 and expediently projects further to the bottom than the lay-on surface 11. This second position of the lay-on detection section 7 is mechanically transferred to the detection unit 4 via the coupling mechanism 12. By way of example, the second position of the lay-on detection section 7 causes the coupling element 14 to not actuate the detection unit 4.

Concerning the second variant, the coupling mechanism 12 is expediently designed to provide the mechanical coupling between the lay-on detection section 7 and the detection unit 4 invariantly to a pivoting about the second pivot axis, so that the lay-on detection device 7 correctly detects the first and/or the second lay-on state in different second positions of the drive section 26 about the second pivot axis. By way of example, the actuation section 16 is designed concentrically to a pivot axis of the second pivot joint.

Figure 9:
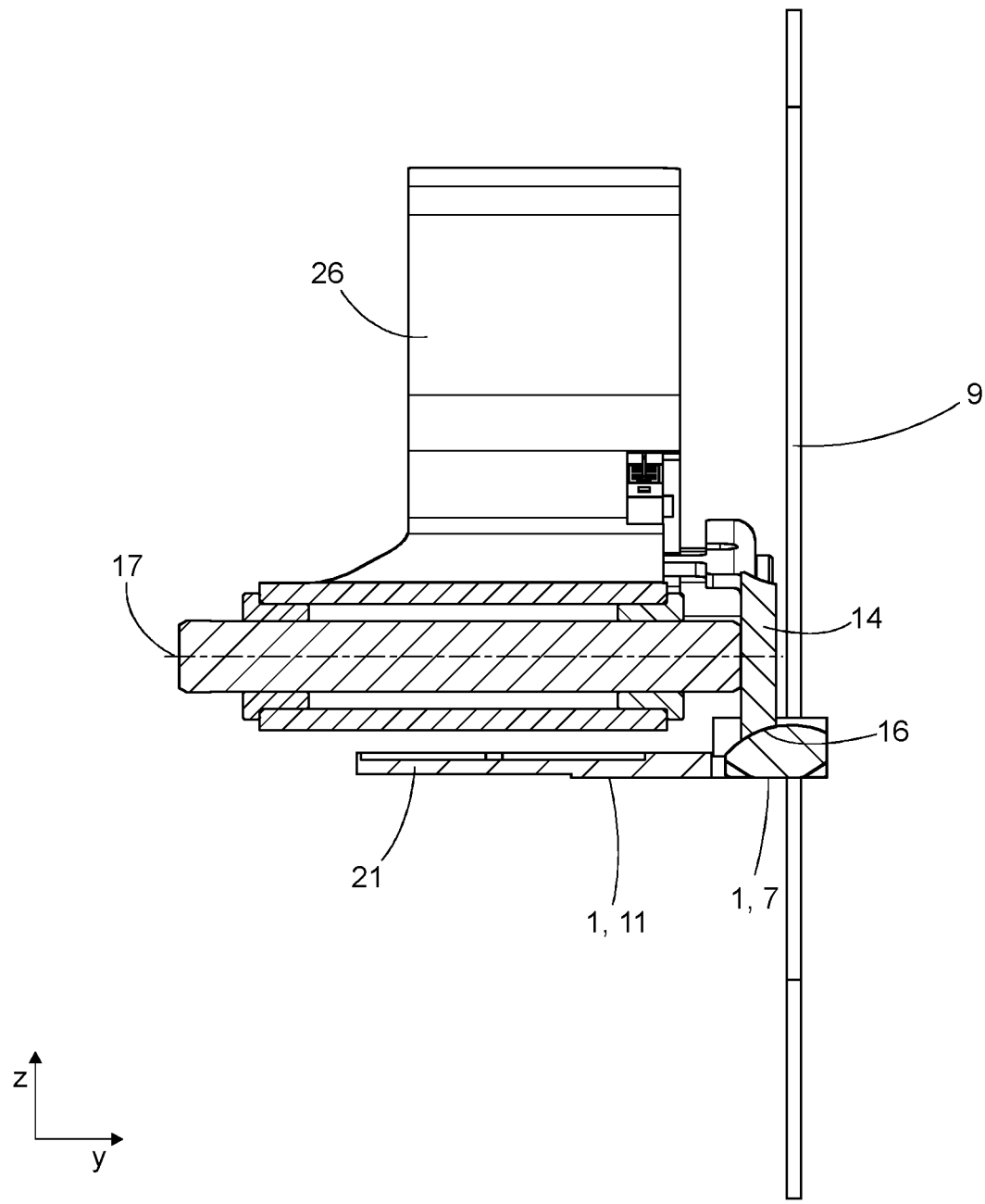
Figure 10:
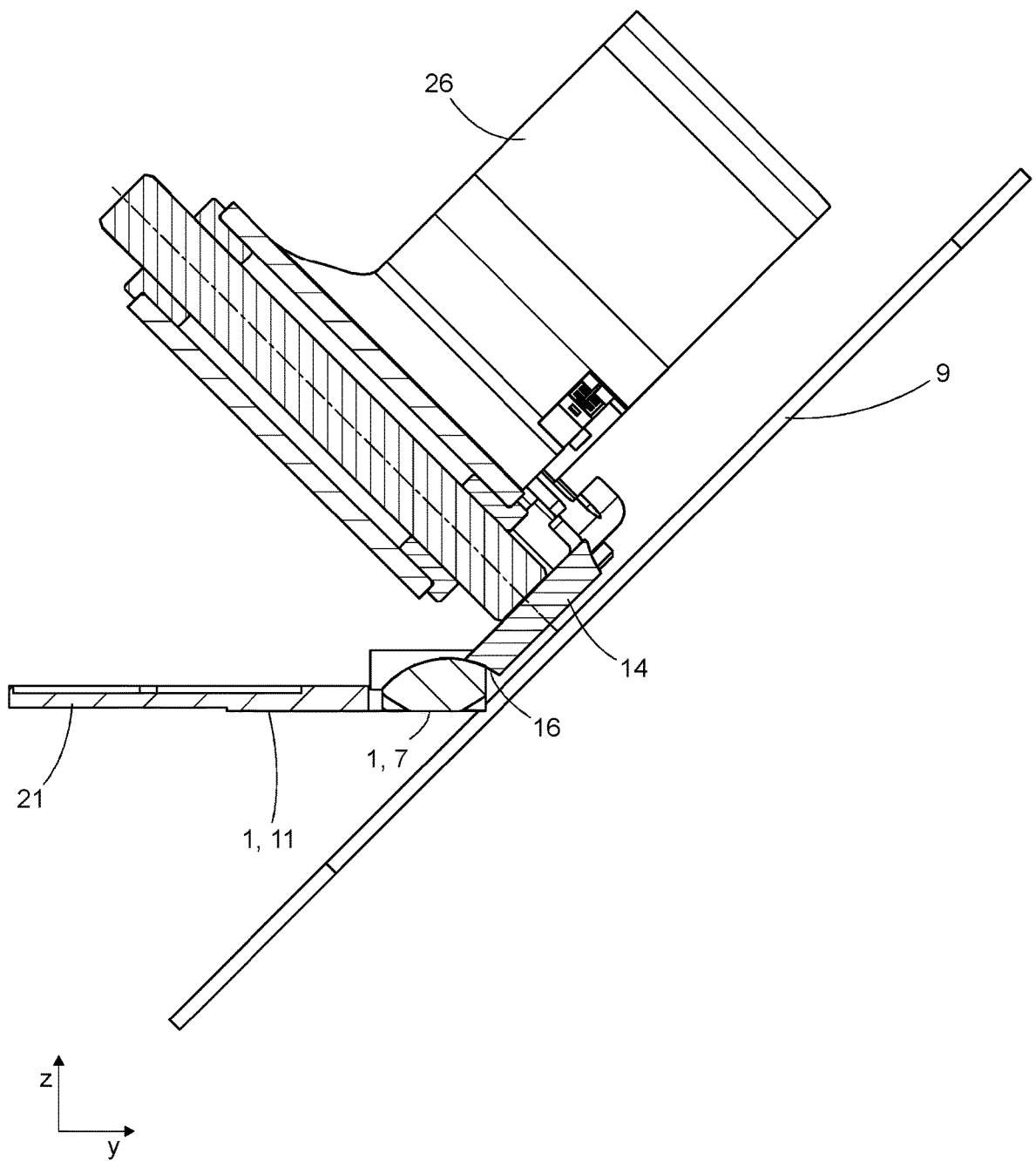

A corresponding design of the actuation section 16 is shown in FIGS. 9 and 10. The (physically not present) second pivot axis by way of example runs parallel to the x-direction. The actuation section 16 which contacts the lay-on detection section 7 is designed in a circle-segment-shaped manner in the y-z section, wherein the centre of the circle of the circle segment shaped actuation section 16 lies on the second pivot axis. Expediently, the actuation section 16 is designed concavely in the y-z section. The upper side of the lay-on detection section 7 which contacts the actuation section 16 is expediently likewise designed in a circle-segment-shaped manner in the y-z section and concentrically to the second pivot axis. The upper side of the lay-on detection section 7 in particular is designed in a convex manner.

In FIGS. 9 and 10, the drive section 26 and the tool 9 are situated in different second pivoting positions relative to the lay-on section 1, in particular to the lay-on surface 11. By way of the described design of the actuation section 16, the influence of the pivoting about the second pivot axis upon the actuation of the actuation section 16 is minimised or eliminated.

Figure 11:
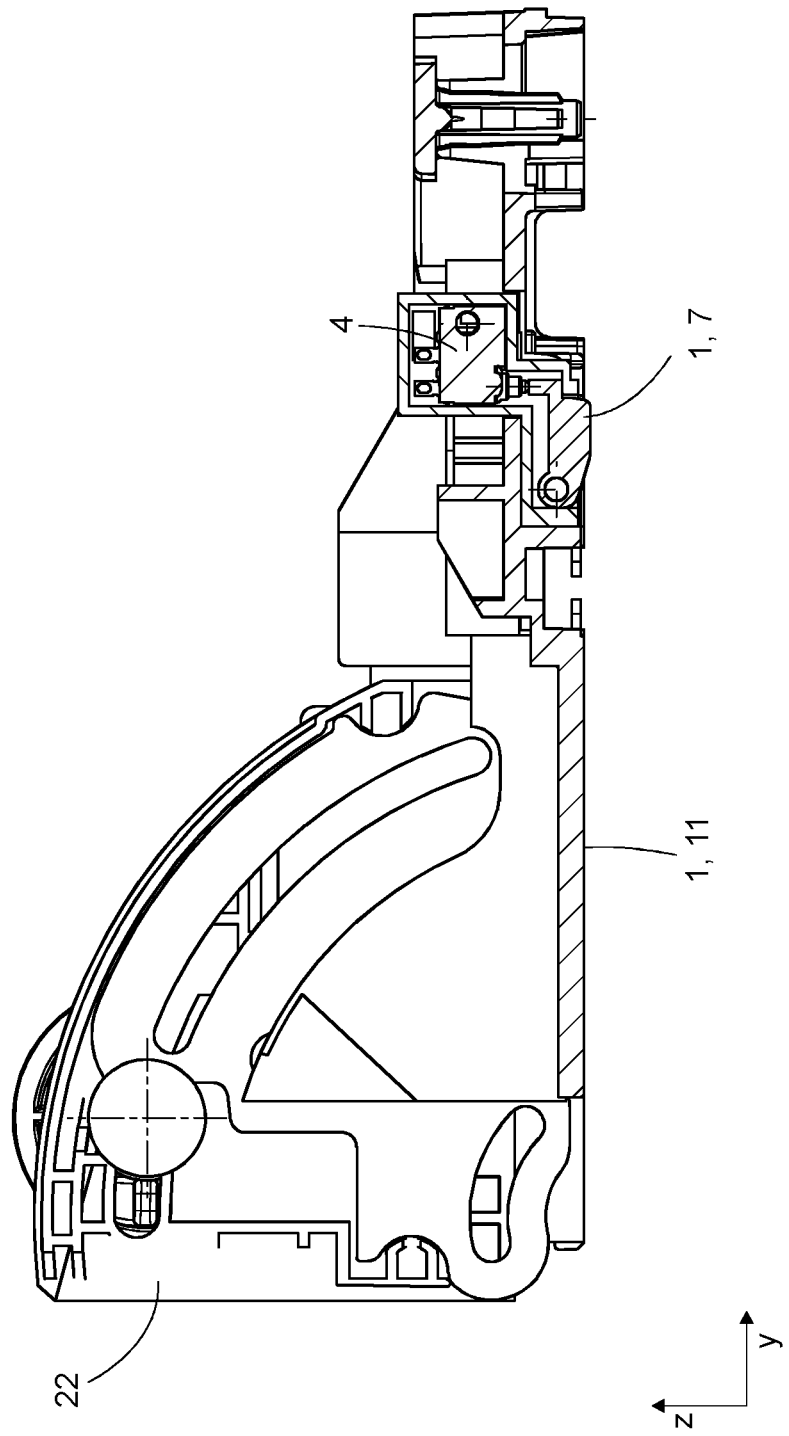

FIG. 11 shows a third variant of the lay-on detection device 3. According to the third variant, the detection unit 4 is part of the base section 19 and in particular is mounted in a non-movable manner to the lay-on section 1. By way of example, the detection unit 4 is arranged in the base plate 21.

The detection unit 4 can be actuated via a movably, in particular pivotably mounted lay-on detection section 7. The lay-on detection section 7 by way of example is pivotably mounted about a pivot axis which is aligned parallel to the x-direction. The lay-on detection section 7 is arranged below the detection unit 4 in the z-direction, expediently in a recess in a base plate 21.

Hereinafter, the operating state which is to be determined is to be dealt with. The electric tool 10 is preferably designed to determine an error state, in particular a kickback state, and/or a machining state, as the operating state.

What is meant by the term "kickback" is typically a state in which a sudden and unexpected force occurs between the electric tool 10 and the workpiece during the machining of the workpiece by the electric tool 10, by way of which force the electric tool 10 is brought into motion.

With a kickback, the electric tool 10 lifts from the underlay 2. As a result, a kickback can be recognised by the described lay-on detection device 3, in particular by way of the detection of the second lay-on state.

Alternatively or additionally to this, a machining state, for example that the electric tool 10 lies on the underlay 2 can be recognised as the state to be determined.

The electric tool 10 is preferably designed, as a reaction to the detected operating state, to deactivate the drive of the tool 9, to stop the tool 9 and/or to bring the tool 9 into a safety position. Furthermore, the electric tool 10 is preferably designed to provide an operating state signal as a reaction to the detected operating state.

In particular, the electric tool 10 is designed to switch the drive for the deactivation into an idling operation. For this, the electric tool 10 is preferably designed to switch the motor without voltage and/or to decouple a drive train of the drive unit.

The electric tool 10 is preferably designed to actively brake the tool 9, in particular to actively stop it. Expediently, the electric tool 10 is designed to actively brake the motor for this purpose. The electric tool 10 is designed by way of example to brake the motor by way of a short circuit and/or applying a counter-field.

The electric tool 10 is preferably designed, on determining the operating state to take into account a further input variable, in particular a distance, a force, a pressure, a moment, an acceleration, a rotation rate, a current, a voltage, a speed, a torque, a temperature and/or a sound, additionally to the detected lay-on state.

In a preferred design, the electric tool 10 is designed to take into account a current which is related to the drive of the tool 9, as a further input variable. In particular, the current is a motor current, a battery current and/or mains current. Expediently, the electric tool 10 is designed to take into account an amplitude and/or change rate of the current.

The electric tool 10 is expediently designed to compare the further input variable, in particular the current, with a threshold value and to take into account the result of the comparison on determining the operating state. Expediently, the electric tool 10 is designed to determine the kickback state when, in particular only when, the further input variable, in particular the current, lies above the threshold value. The electric tool in particular is designed to adapt the threshold value, in particular on the basis of a detected rotational speed and/or a detected and/or inputted type of tool 9, in particular a saw blade.

The electric tool 10 is preferably designed to detect the further input variable depending on the detected lay-on state. For example, the electric tool 10 can be designed to detect and/or to take into account the further input variable when, preferably only when, a certain lay-on state, for example the first lay-on state and/or the second lay-on state is detected. Expediently, in the second lay-on state the further input variable, in particular the current, is detected and compared to the threshold value. If the further input variable, in particular the current, lies above the threshold value, then the electric tool 10 expediently determines the kickback state and reacts in one of the aforementioned manners.

Alternatively or additionally to this, the electric tool can also be designed, in the moment of a lay-on state change or for a certain time duration beforehand or afterwards, to detect the further input variable in particular the current, and to compare it with the threshold value. If the further input variable, in particular the current, lies above the threshold value, then the electric tool 10 expediently determines the kickback state and reacts in one of the aforementioned manners.

The electric tool 10 is preferably designed, on determining the operating state, to take into account a currently detected lay-on state and a previously detected lay-on state, in particular a lay-on state change from the previously detected lay-on state to the currently detected lay-on state. Expediently, the electric tool 10 is designed to determine the error state, in particular the kickback state, when the second lay-on state is detected after a previously detected first lay-on state and/or when a lay-on state change from the first lay-on state to the second lay-on state is detected. The electric tool 10 is preferably designed to not take into account a lay-on state which was detected before a preceding switching-on and switching-off of the electric tool, on determining the operating state.

In this manner it may be prevented that the electric tool concludes an operating state—in particular the kickback state—although this state is not present.

In FIG. 1, the electric tool 10 lies for example with the second region 6 of the lay-on section 1 on the underlay 2. The electric tool 10 does not lie with the first region 5 on the underlay 2. The lay-on detection device 3 accordingly detects the second lay-on state. The electric tool 10 here however does not determine the kickback state, since no first lay-on state was detected before the second lay-on state and/or since no lay-on state change from the first lay-on state to the second lay-on state was detected. It is only after the electric tool 10 has been pushed with the first region 5, in particular with the lay-on detection section 7, onto the underlay 2 that the kickback state is determined on detecting the second lay-on state.

Expediently, the electric tool 10 is designed to determine a kickback state as the operating state, namely when the following conditions are cumulatively fulfilled: the lay-on detection device 3 detects the second lay-on state; before the second lay-on state the lay-on detection device 3 has detected the first lay-on state; a current which is related to the motor which drives the tool 9, in particular the amplitude and/or the rate of change of this current, lies above a predefined threshold value.

The electric tool 10 in particular can be operated according to the following method:

The electric tool 10 is placed with its lay-on section 1, in particular with the second region 6 onto an underlay 2. The drive of the tool 9 is started via the operating device 28. The electric tool 10 is pushed in the feed direction onto the underlay 2. The first region 5, in particular the lay-on detection section 7 is pushed onto the underlay 2. The lay-on detection section 7 is actuated by the underlay 2. The electric tool detects the first lay-on state on the basis of the actuation of the lay-on detection section 7. A kickback state occurs.

The electric tool with the first region 5, in particular with the lay-on section 1 lifts from the underlay 2. The lay-on detection section is no longer actuated by the underlay 2. The electric tool detects the second lay-on state on the basis of the non-actuation of the lay-on detection section 7 and determines that a kickback state is present. The drive of the tool 9 is deactivated on the basis of the kickback state.

Figure 13:
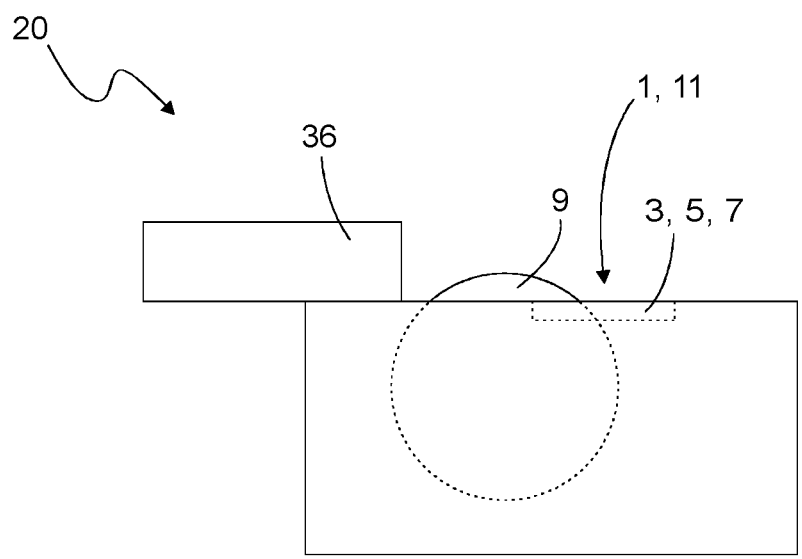

FIG. 13 shows an electric tool 20 which by way of example is designed as a stationary electric tool, in particular as a bench saw, preferably as a circular bench saw. The electric tool comprises a lay-on section 1 for laying on a workpiece 36. The lay-on section 1 preferably comprises a lay-on surface 11. The lay-on section 1, in particular the lay-on surface 11 is expediently directed normally to the z-direction and upwards in the z-direction. The electric tool 20 comprises a tool 9, which extends further upwards in the z-direction than the lay-on section 1. The electric tool 20 comprise a lay-on detection device 3 and is designed to detect, by way of the lay-on detection device 3, a first lay-on state, in which the tool 36 lies on at least a first region 5 of the lay-on section 1 of the electric tool 20, and/or a second lay-on state, in which the tool 36 does not lie on at least the first region 5 of the lay-on section 1 of the electric tool 20 and to determine an operating state of the electric tool 20 on the basis of the detected lay-on state.

The electric tool 20 is expediently designed according to or analogously to one of the aforementioned embodiments of the electric tool 10.

The invention claimed is:

1. A plunge saw with a lay-on section for laying the plunge saw onto an underlay, wherein the plunge saw comprises:
   a saw blade,
   a lay-on detection device, wherein the plunge saw is designed to detect, as a detected lay-on state, by way of the lay-on detection device, a first lay-on state, in which the plunge saw lies with at least a first region of the lay-on section on the underlay, and/or
   a second lay-on state, in which the plunge saw does not lie with at least the first region on the underlay, and to determine an operating state of the plunge saw on a basis of the detected lay-on state,
   wherein the lay-on detection device for detecting the first and/or the second lay-on state comprises a detection unit and a lever element, the lever element comprising a lay-on detection section which is formed by an end section of the lever element, wherein the lever element is designed to mechanically actuate the detection unit based on whether the lay-on detection section is actuated by the underlay,
   wherein the lay-on detection device is designed to detect the first and/or the second lay-on state on the basis of whether the detection unit is mechanically actuated by the lever element,
   wherein the plunge saw comprises a drive section for driving the saw blade, wherein the detection unit is arranged on the drive section and the lever element is movably mounted on the drive section,
   wherein the plunge saw comprises a first pivot joint, via which the drive section together with the detection unit can be pivoted relative to the lay-on section into different first pivot positions, so as to adjust a plunge depth of the saw blade,
   wherein the lay-on detection section in a feed direction is arranged behind a region of the saw blade.

2. The plunge saw according to claim 1, wherein the lever element is designed to provide a mechanical coupling between the lay-on detection section and the detection unit invariantly to the first pivot positions, so that the lay-on detection device correctly detects the first and/or the second lay-on state in different first pivot positions of the drive section.

3. The plunge saw according to claim 1, wherein the lay-on detection section comprises an actuation contour formed by an end contour of the lever element wherein the actuation contour is actuatable by the underlay and is designed concentrically to a pivot axis of the first pivot joint.

4. The plunge saw according to claim 1, wherein the lay-on section comprises a lay-on surface and the lay-on detection section is movably mounted relative to the lay-on surface.

5. The plunge saw according to claim 1, wherein the plunge saw is designed, for determining the operating state, to take into account, additionally to the detected lay-on state, one or more further input variables.

6. The plunge saw according to claim 5, wherein the plunge saw is designed to detect the further input variable depending on the detected lay-on state.

7. The plunge saw according to claim 5, wherein the further input variable comprises a distance, a force, a pressure, a moment, an acceleration, a rotation rate, a current, a voltage, a speed, a torque, a temperature and/or a sound.

8. The plunge saw according to claim 1, wherein the plunge saw is designed, for determining the operating state, to take into account a currently detected lay-on state and a previously detected lay-on state.

9. The plunge saw according to claim 1, wherein plunge saw is designed to determine a kickback state as the operating state, and specifically depending on whether the following conditions are cumulatively fulfilled:

the lay-on detection device detects the second lay-on state;
the lay-on detection device has detected the first lay-on state before the second lay-on state;
a current which is related to the motor which drives the saw blade lies above a predefined threshold value.

10. The plunge saw according to claim 1, wherein the plunge saw is designed to determine, as the operating state, an error state, and/or a machining state.

11. The plunge saw according to claim 1, the plunge saw is designed, as a reaction to the detected operating state, to deactivate the drive of the saw blade, to stop the saw blade and/or to bring the saw blade into a safety position.

12. The plunge saw according to claim 1, wherein the plunge saw is designed, for determining the operating state, to take into account a lay-on state change from a previously detected lay-on state to a currently detected lay-on state.

13. The plunge saw according to claim 1, wherein the detection unit is motion-coupled with the drive section, such that by pivoting the drive section via the first pivot joint relative to the lay-on section into a pivot position, the detection unit is pivoted together with the drive section.

14. The plunge saw according to claim 1, wherein the lever element is arranged such that the lay-on detection section of the lever element directly contacts the underlay when the lay-on section lies on the underlay.

15. The plunge saw according to claim 14, wherein the lever element is pivotably mounted on the drive section about a lever element pivot axis, wherein the lever element pivot axis and the pivot axis of the first pivot joint are oriented parallel to one another and are spaced apart from each other in a direction orthogonal to a direction of the lever element pivot axis.

* * * * *